(12) United States Patent
Wang et al.

(10) Patent No.: US 12,388,297 B2
(45) Date of Patent: Aug. 12, 2025

(54) WIRELESS CHARGING TRANSMITTER, WIRELESS CHARGING RECEIVER, AND WIRELESS CHARGING SYSTEM

(71) Applicant: Huawei Digital Power Technologies Co., Ltd., Shenzhen (CN)

(72) Inventors: Shuyang Wang, Shenzhen (CN); Zhixian Wu, Dongguan (CN); Yanding Liu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/582,151

(22) Filed: Feb. 20, 2024

(65) Prior Publication Data

US 2024/0195224 A1    Jun. 13, 2024

Related U.S. Application Data

(63) Continuation of application No. PCT/CN2022/098323, filed on Jun. 13, 2022.

(30) Foreign Application Priority Data

Oct. 28, 2021    (CN) .......................... 202111266323.1

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *B60L 53/126* (2019.02); *H02J 50/80* (2016.02)

(58) Field of Classification Search
CPC ......... H02J 50/12; H02J 50/80; B60L 53/126; B60L 53/122
(Continued)

(56) References Cited

U.S. PATENT DOCUMENTS

| | | | |
|---|---|---|---|
| 2014/0191713 A1* | 7/2014 | Hong ...................... | H02J 50/12 320/108 |
| 2014/0347008 A1* | 11/2014 | Chae ...................... | H02J 50/12 320/108 |

(Continued)

FOREIGN PATENT DOCUMENTS

| | | |
|---|---|---|
| CN | 111478458 A | 7/2020 |
| CN | 114142623 A | 3/2022 |

*Primary Examiner* — Alfonso Perez Borroto
(74) *Attorney, Agent, or Firm* — Conley Rose, P.C.

(57) ABSTRACT

In a wireless charging transmitter, an output end of an inverter is connected to a transmitter LCC network; an output end of the transmitter LCC network is connected to a transmit coil; and a switch circuit is connected to the transmitter LCC network. The receiver includes a receiver LCC network. When a real part of a first output impedance of the inverter is greater than a real part of a second output impedance of the inverter, a transmitter controller controls the switch circuit to act, so that the wireless charging system works in a double-sided LCC network. When the real part of the first output impedance is less than or equal to the real part of the second output impedance, the transmitter controller controls the switch circuit to act, so that the wireless charging system works in a single-sided LCC network.

20 Claims, 9 Drawing Sheets

(51) Int. Cl.
*B60L 53/126* (2019.01)
*H02J 50/80* (2016.01)

(58) Field of Classification Search
USPC .......................................... 307/104
See application file for complete search history.

(56) References Cited

U.S. PATENT DOCUMENTS

2019/0315246 A1* 10/2019 Li ........................... B60L 53/68
2020/0044491 A1* 2/2020 Qiu ......................... H02J 50/80
2020/0395787 A1* 12/2020 Bae ..................... H02J 7/00714
2021/0066961 A1* 3/2021 Mi .......................... H02J 50/80

* cited by examiner

WIRELESS CHARGING TRANSMITTER, WIRELESS CHARGING RECEIVER, AND WIRELESS CHARGING SYSTEM

CROSS-REFERENCE TO RELATED APPLICATIONS

This is a continuation of Int'l Patent App. No. PCT/CN2022/098323, filed on Jun. 13, 2022, which claims priority to Chinese Patent App. No. 202111266323.1, filed on Oct. 28, 2021, both of which are incorporated by reference.

FIELD

This disclosure relates to the field of vehicle wireless charging technologies, and in particular, to a wireless charging transmitter, a wireless charging receiver, and a wireless charging system.

BACKGROUND

With aggravation of energy shortage and environmental pollution in the modern society, as new energy vehicles, electric vehicles have received widespread attention. The electric vehicle is powered by a power battery pack, and the power battery pack needs to be charged.

Currently, charging manners of the electric vehicles include contact charging and wireless charging. The wireless charging manner is easy to use and has no spark or electric shock risk, and therefore becomes a development direction of future electric vehicle charging. A wireless charging system of the electric vehicle includes a transmitter and a receiver. The transmitter is located on the ground, the receiver is located on the vehicle, and the receiver charges the power battery pack of the electric vehicle. The transmitter includes an inverter, a transmitter compensation network, and a transmit coil. The receiver includes a receive coil, a receiver compensation network, and a rectifier. A direct-current voltage of an output end of the transmitter is inverted by the inverter to generate a high-frequency alternating current, which passes through the transmitter compensation network and the transmit coil to generate a high-frequency magnetic field. An induced electromotive force is obtained through coupling at the receive coil, and a direct current is formed through rectification by the rectifier to charge the power battery pack. A function of the transmitter compensation network is to resonate with the transmit coil by using an inductor and/or a capacitor, to compensate for a reactive component in a line, so that a direct current input side is purely resistive as far as possible, to improve efficiency of the entire wireless charging system. A function of the receiver compensation network is similar, and the receiver compensation network resonates with the receive coil.

However, during actual charging of the wireless charging system, a gap between a vehicle chassis and the ground varies greatly with different vehicle types. In other words, a distance between the transmitter and the receiver varies with different vehicle types. For example, a gap between a chassis of an SUV and the ground is generally large while a gap between a chassis of a car and the ground is generally small. Due to such a difference, the wireless charging system needs to implement efficient power transmission within a wide offset range. An offset between a receive coil located on the vehicle and the transmit coil located on the ground affects a coupling coefficient between the transmitter and the receiver, and also affects a self-inductance of the transmit coil and a self-inductance of the receive coil.

Therefore, how to enable the wireless charging system to have high charging efficiency when used in different types of vehicles is a technical problem that needs to be resolved by a person skilled in the art.

SUMMARY

To resolve the foregoing technical problem, this disclosure provides a wireless charging transmitter, a wireless charging receiver, and a wireless charging system, which have a wide coupling range and have high charging efficiency when applied to different vehicle types.

This disclosure provides a wireless charging transmitter, including an inverter, a transmitter inductor-capacitor-capacitor (LCC) network, a transmit coil, a switch circuit, and a transmitter controller. The inverter converts a direct current of an input end into an alternating current and transmits the alternating current to the transmitter LCC network. The transmitter LCC network compensates the alternating current and then transmits an alternating current obtained through compensation to the transmit coil. The switch circuit is connected to the transmitter LCC network. The transmit coil transmits the received alternating current in a form of an alternating magnetic field, so that a receiver receives the alternating current. The receiver includes a receiver LCC network. When a real part of a first output impedance of the inverter is greater than a real part of a second output impedance of the inverter, the transmitter controller controls the switch circuit to act, so that a wireless charging system works in a double-sided LCC network. When the real part of the first output impedance is less than or equal to the real part of the second output impedance, the transmitter controller controls the switch circuit to act, so that the wireless charging system works in a single-sided LCC network. The double-sided LCC network includes the transmitter LCC network and the receiver LCC network, and the single-sided LCC network includes the receiver LCC network. The first output impedance is an output impedance of the inverter when the wireless charging system works in the double-sided LCC network, and the second output impedance is an output impedance of the inverter when the wireless charging system works in the single-sided LCC network.

Because the switch circuit is added to the transmitter, whether the transmitter LCC network participates in working may be determined by using the switch circuit based on a requirement of the wireless charging system. When coupling between the transmit coil and the receive coil is poor, that is, M is small, to implement zero-voltage switching (ZVS) of a switching transistor of the inverter, the transmitter LCC network is controlled to participate in working, and the wireless charging system works in the double-sided LCC network, so that high wireless charging efficiency can be implemented. When the coupling between the transmit coil and the receive coil of the wireless charging system is good, that is, M is large, if the wireless charging system uses the double-sided LCC network, it is difficult for a switching transistor in the inverter of the transmitter to implement ZVS, and the switching transistor is in a hard switching state and generates severe heat, which increases power consumption and may not normally run. Therefore, the transmitter controller controls the transmitter LCC network not to participate in working, that is, the wireless charging system works in the single-sided LCC network, and the transmit coil presents an inductance, so that ZVS of the switching transistor in the inverter is easily implemented, thereby reducing power consumption and improving wireless charging efficiency. Therefore, the transmitter provided in this embodiment can ensure high charging efficiency when the coupling between the transmitter and the receiver is good, and can also ensure high charging efficiency when the coupling between the transmitter and the receiver is low, so that the transmitter has a wide coupling range, and can be applied to charging of electric vehicles of different vehicle types, while ensuring high charging efficiency.

The following describes a specific implementation of the switch circuit. For example, the switch circuit includes two switches, which is simple in hardware implementation and convenient to control. The transmitter LCC includes a first inductor, a first capacitor, and a compensation capacitor. The switch circuit includes a first switch and a second switch. The circuit may control, in different states of the switches, whether the transmitter LCC participates in working. Specifically, a first end of the first inductor is connected to a midpoint of a first bridge arm of the inverter, and a second end of the first inductor is connected to a first end of the transmit coil by using the compensation capacitor. A second end of the transmit coil is connected to a midpoint of a second bridge arm of the inverter, a first end of the first capacitor is connected to the second end of the first inductor, a second end of the first capacitor is connected to a first end of the second switch, and a second end of the second switch is connected to the second end of the transmit coil. A first end of the first switch is connected to the first end of the first inductor, and a second end of the first switch is connected to the first end of the transmit coil. The transmitter controller is configured to: when the real part of the first output impedance is greater than the real part of the second output impedance, control the first switch to be open, and the second switch to be closed, so that the wireless charging system works in the double-sided LCC network; and when the real part of the first output impedance is less than or equal to the real part of the second output impedance, control the first switch to be closed, and the second switch to be open, so that the wireless charging system works in the single-sided LCC network.

A manner of obtaining the first output impedance is not limited, which may be obtained by the transmitter, or may be obtained by the receiver. The following describes a case in which the first output impedance is obtained by the transmitter. In a possible implementation, the transmitter controller is further configured to obtain the first output impedance based on the first inductor in the transmitter LCC network, a second inductor in the receiver LCC network, a load impedance of the receiver, and a mutual inductance between the transmitter and the receiver.

A manner of obtaining the second output impedance is not limited, which may be obtained by the transmitter, or may be obtained by the receiver. The following describes a case in which the second output impedance is obtained by the transmitter. In a possible implementation, the transmitter controller is further configured to obtain the second output impedance based on the second inductor in the receiver LCC network, the load impedance of the receiver, and the mutual inductance between the transmitter and the receiver.

A manner of obtaining the mutual inductance is not limited. The following describes a possible implementation. The transmitter controller obtains the mutual inductance based on the first inductor in the transmitter LCC network, the second inductor in the receiver LCC network, a current of the second inductor, an input voltage of the inverter, and a phase shift angle of the inverter. The phase shift angle of the inverter is a phase difference between an output voltage and an output current of the inverter.

In a possible implementation, the transmitter controller is further configured to obtain the load impedance of the receiver based on an output voltage of the receiver and a preset current. The preset current may be set based on an empirical value. This is not specifically limited. The output voltage of the receiver may be obtained through sampling. The load impedance may be obtained by dividing, by the preset current, the output voltage obtained through sampling.

In a possible implementation, the transmitter controller is further configured to obtain the first output impedance $Z_{in\_re1}$ according to the following formula:

$$Z_{in\_re1} = \frac{(\omega L_1 L_2)^2}{M^2 R_0}$$

ω represents an angular velocity, $L_1$ represents an inductance value of the first inductor, $L_2$ represents an inductance value of the second inductor, M represents the mutual inductance, and $R_0$ represents the output impedance.

In a possible implementation, the transmitter controller is further configured to obtain the second output impedance $Z_{in\_re2}$ according to the following formula:

$$Z_{in\_re2} = \frac{M^2 R_0}{L_2^2}$$

$L_2$ represents an inductance value of the second inductor, M represents the mutual inductance, and $R_0$ represents the output impedance.

In a possible implementation, the transmitter controller is further configured to obtain the mutual inductance M according to the following formula:

$$M = \frac{\omega L_1 L_2 \cdot I_{L2}}{\frac{2\sqrt{2}}{\pi} \cdot V_{dc} \cdot \sin\left(\frac{\theta}{2}\right)}$$

ω represents an angular velocity, $L_1$ represents an inductance value of the first inductor, $L_2$ represents an inductance value of the second inductor, $I_{L2}$ represents the inductance of the second inductor, $V_{dc}$ represents the input voltage of the inverter, and θ represents the phase shift angle.

In the foregoing description, the transmitter is used as an execution body. The transmitter compares the real part of the first output impedance with the real part of the second output impedance, and controls an action of the switch circuit based on a comparison result, to switch between the double-sided LCC network and the single-sided LCC network. It should be understood that the receiver may also be used as an execution body. The receiver compares the real part of the first output impedance with the real part of the second output impedance, and sends a comparison result to the transmitter, or sends an instruction to the transmitter based on the comparison result, so that the transmitter directly controls an action of the switch circuit, to switch between the double-sided LCC network and the single-sided LCC network. The foregoing other actions performed by the transmitter may also be performed by the receiver. Based on the wireless charging transmitter provided in the foregoing embodiment, this disclosure further provides a wireless charging receiver. Advantages of the foregoing implementations are also applicable to the receiver. Details are not described herein again.

The following specifically describes an implementation of the receiver. The receiver includes a receive coil, a receiver LCC network, a rectifier, and a receiver controller. The receive coil is configured to receive electric energy from a transmit coil of a transmitter and transmit the electric energy to the receiver LCC network. The receiver LCC network is configured to compensate the received alternating current and then transmit the alternating current to the rectifier. The rectifier is configured to rectify the received alternating current into a direct current to charge a load. The receiver controller is configured to: when a real part of a first output impedance of an inverter of the transmitter is greater than a real part of a second output impedance, send a double-sided LCC network instruction to the transmitter, so that a transmitter LCC network participates in working, and a wireless charging system works in a double-sided LCC network; and when the real part of the first output impedance is less than or equal to the real part of the second output impedance, send a single-sided LCC network instruction to the transmitter, so that the transmitter LCC network does not work, and the wireless charging system works in a single-sided LCC. The double-sided LCC network includes the transmitter LCC network and the receiver LCC network, and the single-sided LCC network includes the receiver LCC network. The first output impedance is an output impedance of the inverter when the wireless charging system works in the double-sided LCC network, and the second output impedance is an output impedance of the inverter when the wireless charging system works in the single-sided LCC network.

The following describes a specific manner of obtaining the first output impedance by the receiver. In a possible implementation, the receiver controller is further configured to obtain the first output impedance based on a first inductor in the transmitter LCC network, the second inductor in the receiver LCC network, a load impedance of the receiver, and a mutual inductance between the transmitter and the receiver.

The following describes a specific manner of obtaining the second output impedance by the receiver. In a possible implementation, the receiver controller is further configured to obtain the second output impedance based on the second inductor in the receiver LCC network, the load impedance of the receiver, and the mutual inductance between the transmitter and the receiver.

A manner of obtaining the mutual inductance is not limited. The following describes a possible implementation. The receiver controller is further configured to obtain the mutual inductance based on the first inductor in the transmitter LCC network, the second inductor in the receiver LCC network, a current of the second inductor, an input voltage of the inverter, and a phase shift angle of the inverter. The phase shift angle of the inverter is a phase difference between an output voltage and an output current of the inverter.

In a possible implementation, the receiver controller is further configured to obtain the load impedance of the receiver based on an output voltage of the receiver and a preset current.

In a possible implementation, the receiver controller is further configured to obtain the first output impedance $Z_{in\_re1}$ according to the following formula:

$$Z_{in\_re1} = \frac{(\omega L_1 L_2)^2}{M^2 R_0}$$

$\omega$ represents an angular velocity, $L_1$ represents an inductance value of the first inductor, $L_2$ represents an inductance value of the second inductor, M represents the mutual inductance, and $R_0$ represents the output impedance.

In a possible implementation, the receiver controller is further configured to obtain the second output impedance $Z_{in\_re2}$ according to the following formula:

$$Z_{in\_re2} = \frac{M^2 R_0}{L_2^2}$$

$L_2$ represents an inductance value of the second inductor, M represents the mutual inductance, and $R_0$ represents the output impedance.

In a possible implementation, the receiver controller is further configured to obtain the mutual inductance M according to the following formula:

$$M = \frac{\omega L_1 L_2 \cdot I_{L2}}{\frac{2\sqrt{2}}{\pi} \cdot V_{dc} \cdot \sin\left(\frac{\theta}{2}\right)}$$

$\omega$ represents an angular velocity, $L_1$ represents an inductance value of the first inductor, $L_2$ represents an inductance value of the second inductor, $I_{L2}$ represents the inductance of the second inductor, $V_{dc}$ represents the input voltage of the inverter, and $\theta$ represents the phase shift angle.

This disclosure provides a wireless charging system, including the transmitter described above and the receiver described above. The transmitter is configured to perform wireless charging for the receiver.

This disclosure has at least the following advantages:

According to the transmitter, the receiver, or the system, whether the transmitter LCC network participates in working may be determined based on a requirement of the wireless charging system. When the coupling between the transmit coil and the receive coil is poor, that is, the mutual inductance M is small, to implement ZVS of the switching transistor of the inverter, the transmitter LCC network is controlled to participate in working, and the wireless charging system works in the double-sided LCC network, so that high wireless charging efficiency can be implemented. When the coupling between the transmit coil and the receive coil of the wireless charging system is good, that is, M is large, if the wireless charging system uses the double-sided LCC network, it is difficult for the switching transistor in the inverter of the transmitter to implement ZVS, and the switching transistor is in a hard switching state and generates severe heat, which increases power consumption and may not normally run. Therefore, the transmitter controller controls the transmitter LCC network not to participate in working, that is, the wireless charging system works in the single-sided LCC network, and the transmit coil presents an inductance, so that ZVS of the switching transistor in the inverter is easily implemented, thereby reducing power consumption and improving wireless charging efficiency. Therefore, the transmitter provided in embodiments can ensure high charging efficiency when the coupling between the transmitter and the receiver is good, and can also ensure high charging efficiency when the coupling between the transmitter and the receiver is low, so that the transmitter has a wide coupling range, and can be applied to charging of electric vehicles of different vehicle types, while ensuring high charging efficiency.

DETAILED DESCRIPTION

The following describes technical solutions in embodiments with reference to accompanying drawings in embodiments.

The following terms such as "first" "second" are merely intended for a purpose of description, and shall not be interpreted as indicating or implying relative importance or implying a quantity of indicated technical features. Therefore, features defined with "first", "second", and the like may explicitly or implicitly include one or more such features. Unless otherwise stated, "a plurality of" means two or more than two.

Unless otherwise expressly specified and limited, the term "connected" should be understood in a broad sense. For example, "connected" may be a fixed connection, or may be a detachable connection or be integrated, which may be directly connected or indirectly connected by using an intermediate medium. In addition, the term "coupling" may be a manner of implementing an electrical connection for signal transmission. The "coupling" may be a direct electrical connection, or may be an indirect electrical connection using an intermediate medium.

To enable a person skilled in the art to better understand technical solutions provided in embodiments, the following first describes a scenario of the technical solutions with reference to an accompanying drawing.

Figure 1:
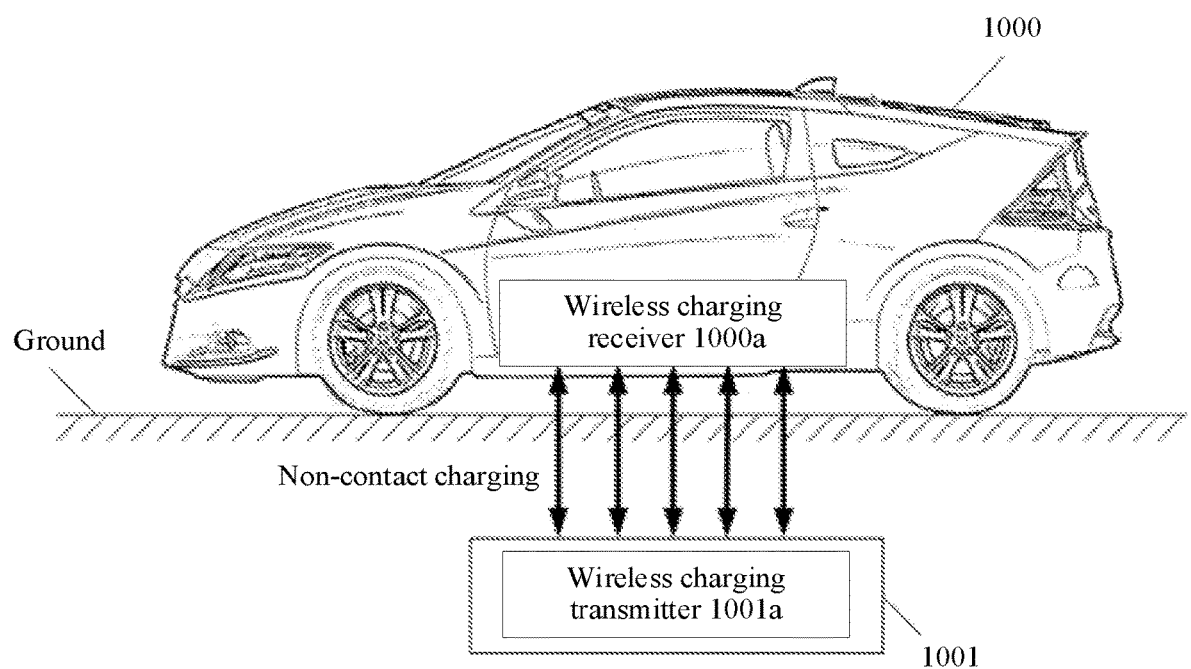
FIG. 1 is a schematic diagram of an electric vehicle wireless charging system.

FIG. 1 is a schematic diagram of an electric vehicle wireless charging system.

A wireless charging receiver 1000a is located on an electric vehicle 1000, and a wireless charging transmitter 1001a is located in a wireless charging station 1001 on ground.

Currently, a charging process of the wireless charging system is that the wireless charging receiver 1000a and the wireless charging transmitter 1001a complete transfer of electric energy in a wireless form, to charge a power battery pack.

The wireless charging station 1001 may be specifically a fixed wireless charging station, a fixed wireless charging parking space, a wireless charging road, or the like. The wireless charging transmitter 1001a may be disposed on the ground or buried under the ground (the figure shows a case in which the wireless charging transmitter 1001a is buried under the ground).

The wireless charging receiver 1000a may be integrated at a bottom of the electric vehicle 1000. When the electric vehicle 1000 enters a wireless charging range of the wireless charging transmitter 1001a, the electric vehicle 1000 may be charged in a wireless charging manner. A power receive module and a rectifier circuit of the wireless charging receiver 1000a may be integrated or separated. This is not specifically limited. When the power receive module and the rectifier circuit are separated, a rectifier in the rectifier circuit is usually placed in the vehicle.

A power transmit module and an inverter of the wireless charging transmitter 1001a may be integrated or separated. In addition, non-contact charging may be that the wireless charging receiver 1000a and the wireless charging transmitter 1001a perform energy transmission in an electric field or magnetic field coupling manner, which may be specifically a manner such as electric field induction, magnetic induction, magnetic resonance, or wireless radiation. This is not specifically limited in this embodiment. The electric vehicle 1000 and the wireless charging station 1001 may further perform bidirectional charging, that is, the wireless charging station 1001 charges the electric vehicle 1000 by using a charging power supply, and the electric vehicle 1000 may discharge electricity into the charging power supply.

Figure 2:
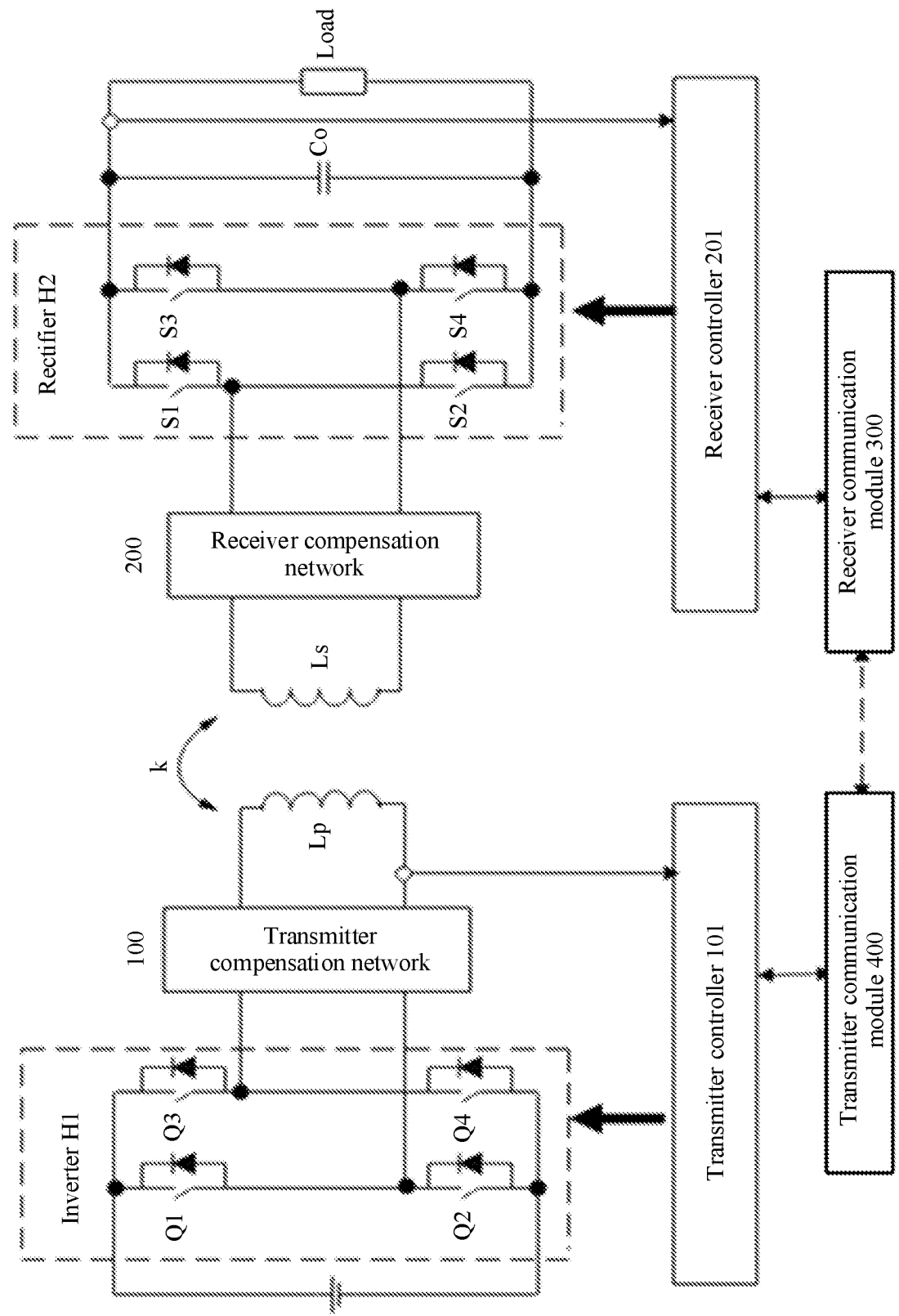
FIG. 2 is a schematic diagram of a circuit of a wireless charging system according to an embodiment.

FIG. 2 is a schematic diagram of a circuit of a wireless charging system according to an embodiment.

The wireless charging system includes a wireless charging transmitter (briefly referred to as a transmitter below) and a wireless charging receiver (briefly referred to as a receiver below). Usually, the transmitter is located on ground and the receiver is located on a vehicle.

The transmitter includes an inverter H1, a transmitter compensation network 100, and a transmit coil Lp.

For example, the inverter H1 is a full-bridge inverter. The inverter H1 may include four controllable switching transistors Q1 to Q4, and the inverter H1 inverts, into an alternating current, a direct current output by a direct-current power supply.

The transmitter compensation network 100 compensates the alternating current output by the inverter H1 and then transmits an alternating current obtained through compensation to the transmit coil Lp.

The transmit coil Lp transmits, in a form of an alternating magnetic field, the alternating current compensated by the transmitter compensation network 100.

The receiver includes a receive coil Ls, a receiver compensation network 200, and a power converter H2.

The receive coil Ls receives, in the form of the alternating magnetic field, electromagnetic energy transmitted by the transmit coil Lp.

The receiver compensation network 200 compensates the alternating current received by the receive coil Ls and then transmits the alternating current to the power converter H2.

For example, the power converter H2 is a full-bridge rectifier H2. The power converter H2 may include four controllable switching transistors S1 to S4, and is configured to convert, into a direct current, the alternating current compensated by the receiver compensation network 200, to charge a load. For an electric vehicle, the load is a vehicle-mounted power battery pack.

A transmitter controller 101 controls the switching transistors of the inverter, and a receiver controller 201 controls the switching transistors of the rectifier.

A receiver communication module 300 performs wireless communication with a transmitter communication module 400.

Figure 3:
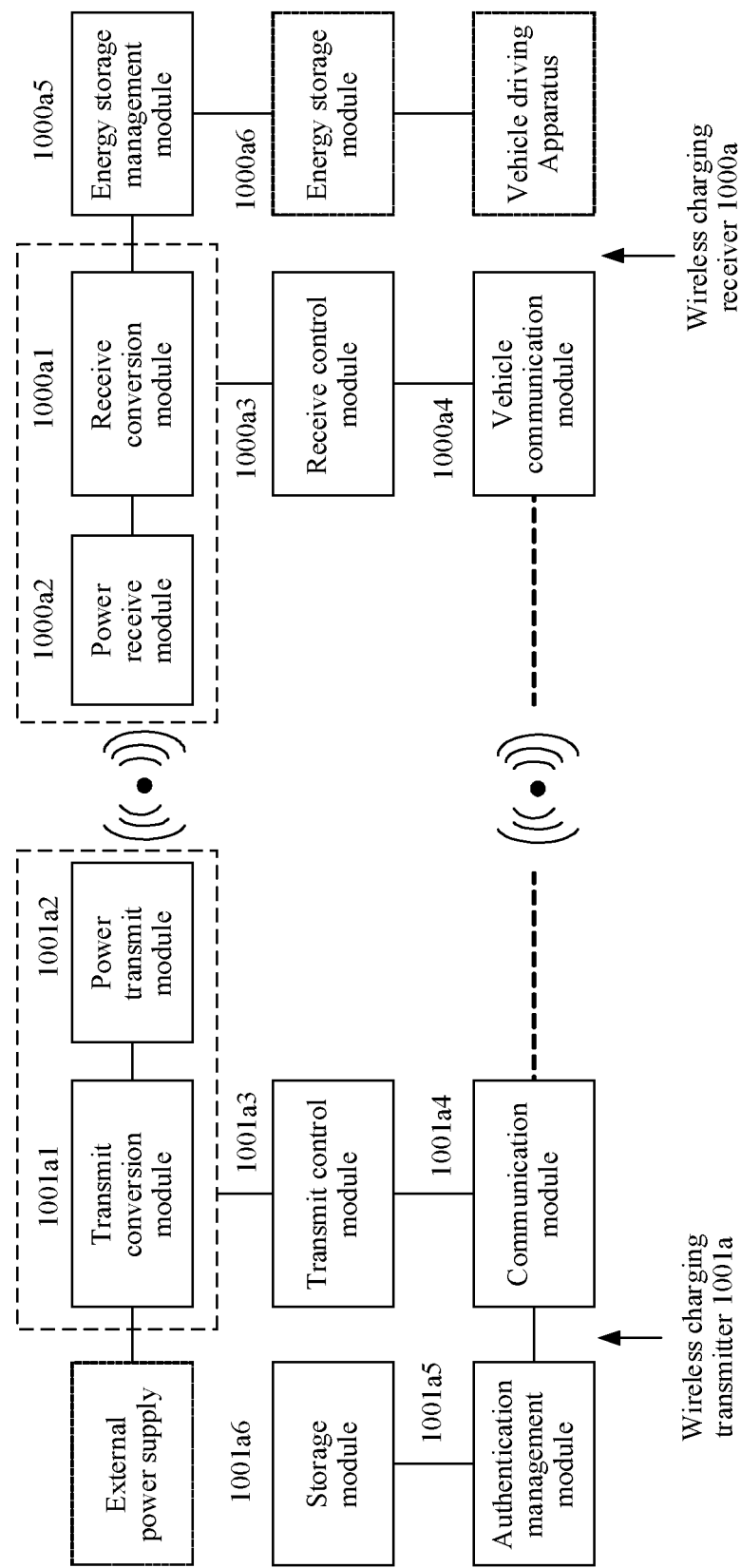
FIG. 3 is a schematic diagram of a structure of the electric vehicle wireless charging system provided in FIG. 2.

FIG. 3 is a schematic diagram of a structure of the electric vehicle wireless charging system provided in FIG. 2.

A wireless charging transmitter 1001a shown in the figure includes a transmitter conversion module 1001a1, a power transmit module 1001a2, a transmitter control module 1001a3, a communication module 1001a4, an authentication management module 1001a5, and a storage module 1001a6.

A wireless charging receiver 1000a includes a power receive module 1000a2, a receive control module 1000a3, a receiver conversion module 1000a1, a vehicle communication module 1000a4, an energy storage management module 1000a5, and an energy storage module 1000a6. In addition, the receiver conversion module 1000a1 may be connected to the energy storage module 1000a6 by using the energy storage management module 1000a5, to charge the energy storage module 1000a6 by using received energy for electric vehicle driving. The energy storage management module 1000a5 and the energy storage module 1000a6 may be located inside the wireless charging receiver 1000a, or may be located outside the wireless charging receiver 1000a. This is not specifically limited in this embodiment. The power receive module 1000a2 includes a receive coil.

The transmit conversion module 1001a1 may be connected to an external power supply, and convert an alternating current or a direct current obtained from the external power supply into a high-frequency alternating current. When the external power supply inputs an alternating current, the transmit conversion module 1001a1 includes at least a power factor correction unit and an inverter. When the external power supply inputs a direct current, the transmit conversion module 1001a1 includes at least an inverter. The power factor correction unit is configured to make an input current phase of the wireless charging system consistent with a voltage phase of a power grid, reduce a harmonic content of the wireless charging system, and increase a power factor value, to reduce pollution of the wireless charging system to the power grid and improve reliability. The power factor correction unit may further increase or decrease an output voltage of the power factor correction unit based on a post-stage requirement. The voltage output by the power factor correction unit is converted into a high-frequency alternating current voltage by the inverter, and then acts on the power transmit module 1001a2. The high-frequency alternating current voltage can improve transmission efficiency and a transmission distance. The external power supply may be located inside or outside the wireless charging transmitter 1001a.

The power transmit module 1001a2 is configured to transmit, in a form of an alternating magnetic field, the alternating current output by the transmit conversion module 1001a1. The power transmit module 1001a2 includes a transmit coil.

The transmitter control module 1001a3 may control voltage, current, and frequency conversion parameter adjustment of the transmit conversion module 1001a1 based on a transmit power requirement of actual wireless charging, to control voltage and current output adjustment of the high-frequency alternating current in the power transmit module 1001a2.

The communication module 1001a4 and the vehicle communication module 1000a4 implement wireless communication between the wireless charging transmitter 1001a and the wireless charging receiver 1000a, including power control information, fault protection information, power-on/off information, mutual authentication information, and the like. The wireless charging transmitter 1001a may receive information that is about the electric vehicle and that is sent by the wireless charging receiver 1000a, such as attribute information, a charging request, and mutual authentication information. In addition, the wireless charging transmitter 1001a may send wireless charging transmission control information, mutual authentication information, wireless charging historical data information, and the like to the wireless charging receiver 1000a. Specifically, a manner of the foregoing wireless communication may include, but is not limited to, any one or any combination of Bluetooth, Wi-Fi, a ZigBee protocol, a radio-frequency identification (RFID) technology, a Long Range LoRa wireless technology, and a near-field communication (NFC) technology. Further, the communication module 1001a4 may communicate with an intelligent terminal of a user of the electric vehicle, and the user implements remote authentication and user information transmission by using a communication function.

The authentication management module 1001a5 is configured to perform mutual authentication and authority management between the wireless charging transmitter 1001a in the wireless charging system and the electric vehicle.

The storage module 1001a6 is configured to store charging process data, mutual authentication data (for example, the mutual authentication information), and authority management data (for example, authority management information) of the wireless charging transmitter 1001a. The mutual authentication data and the authority management data may be set before delivery or may be set by the user. This is not specifically limited in this embodiment.

The power receive module 1000a2 receives, in the form of the alternating magnetic field, electromagnetic energy transmitted by the power transmit module 1001a2. Structural combinations of compensation circuits of the power transmit module 1001a2 and the power receive module 1000a2 in the wireless charging system include an S-S type, a P-P type, an S-P type, a P-S type, an LCL-LCL type, an LCL-P type, an LCC-LCC type, and the like. Currently, a double-sided LCC network is mostly used. In embodiments, an example in which both the transmitter and the receiver have an LCC compensation circuit, that is, LCC-LCC, is used for description. Roles of the wireless charging transmitter 1001a and the wireless charging receiver 1000a are interchangeable, that is, the wireless charging receiver 1000a may charge the wireless charging transmitter 1001a in turn.

The receiver conversion module 1000a1 converts the electromagnetic energy received by the power receive module 1000a2 into a direct current required for charging the energy storage module 1000a6. The receiver conversion module 1000a1 includes at least a compensation circuit and a rectifier. The rectifier converts a high-frequency resonant current received by the power receive module into a direct current.

The receive control module 1000a3 can adjust parameters such as a voltage, a current, and a frequency of the receiver conversion module 1000a1 based on a receive power requirement of actual wireless charging.

To make a person skilled in the art better understand the technical solutions in this disclosure, the following clearly describes the technical solutions in embodiments with reference to accompanying drawings in embodiments. It may be understood that terms such as "first" and "second" in the following embodiments are merely for case of description, and do not constitute a limitation on this disclosure.

In actual application, a distance between the receiver located on a vehicle and the transmitter located on ground varies with different vehicle types of electric vehicles. As a result, a coupling coefficient between the transmit coil and the receive coil changes. According to the technical solutions provided in embodiments, the coupling coefficient between the transmitter and the receiver can be adjusted based on different vehicle types. That is, the transmitter and the receiver have a wide coupling range, and high charging efficiency is ensured in different scenarios. For example, for a car that has a low chassis, the distance between the receiver and the transmitter is short, and the coupling coefficient is large. For a sport utility vehicle that has a high chassis, the distance between the receiver and the transmitter is long, and the coupling coefficient is small. According to the technical solutions provided in embodiments, a compensation network may be adjusted based on a value of the coupling coefficient, to obtain an appropriate impedance, and adjust a phase difference between an output voltage and an output current of the inverter of the transmitter, so that a switching transistor of the inverter can implement ZVS, thereby reducing power consumption and improving wireless charging efficiency. In embodiments, to implement ZVS of the inverter, an architecture of the compensation network is specifically adjusted based on an impedance value of the inverter, so that the wireless charging system can switch between a double-sided LCC and a single-sided LCC, that is, the transmitter LCC compensation network sometimes participates in working, and sometimes may not participate in working. When the transmitter LCC participates in working, the wireless charging system uses the double-sided LCC. When the transmitter LCC does not participate in working, the wireless charging system uses the single-sided LCC.

The following describes, with reference to accompanying drawings, specific implementations of the transmitter provided in embodiments.

First, a specific implementation in which both transmitter and receiver compensation networks are LCC is described.

Figure 4:
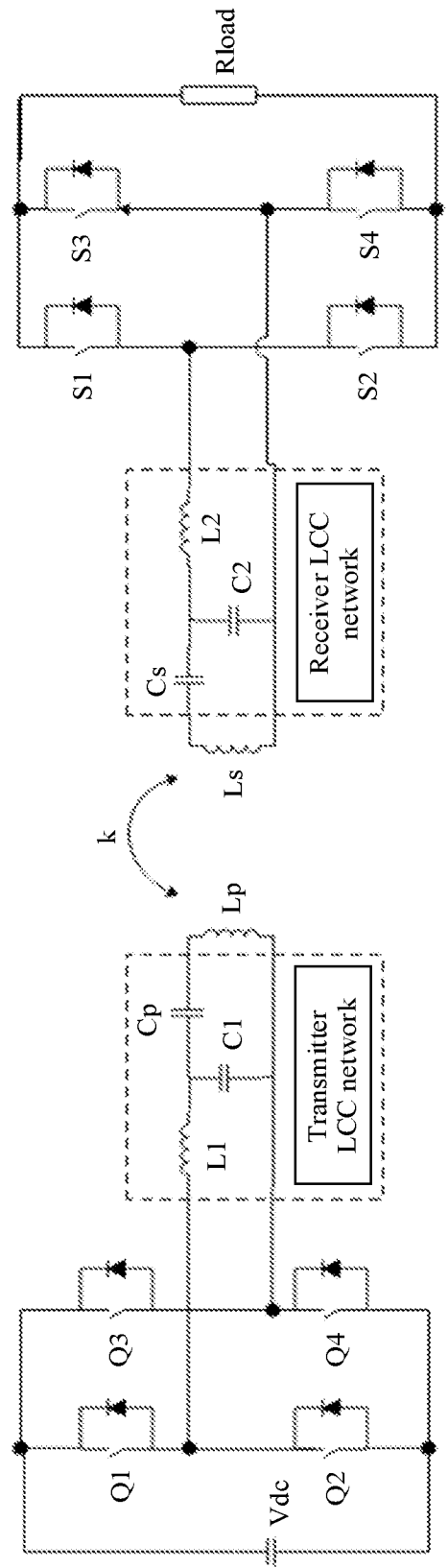
FIG. 4 is a schematic diagram of a wireless charging system according to an embodiment.

FIG. 4 is a schematic diagram of a wireless charging system according to an embodiment.

It can be learned from FIG. 4 that the transmitter includes a transmitter LCC network, and the receiver includes a receiver LCC network.

The transmitter LCC network includes a first inductor L1, a first capacitor C1, and a compensation capacitor Cp.

A first end of the first inductor L1 is connected to a midpoint of a first bridge arm of the inverter, and a second end of the first inductor L1 is connected to a first end of a transmit coil Lp by using the compensation capacitor Cp. A second end of the transmit coil Lp is connected to a midpoint of a second bridge arm of the inverter, a first end of the first capacitor C1 is connected to the second end of the first inductor L1, and a second end of the first capacitor C1 is connected to the second end of the transmit coil Lp. The first bridge arm of the inverter includes a first switching transistor Q1 and a second switching transistor Q2 that are connected in series. It can be learned from FIG. 4 that a common end of Q1 and Q2 is the midpoint of the first bridge arm. Similarly, the second bridge arm of the inverter includes a third switching transistor Q3 and a fourth switching transistor Q4, and a common end of Q3 and Q4 is the midpoint of the second bridge arm.

The receiver LCC network includes a second inductor, a second capacitor, and a compensation capacitor Cs.

A first end of the compensation capacitor Cs is connected to a first end of a receive coil Ls, a second end of the compensation capacitor Cs is connected to a first end of the second inductor L2, a second end of the second inductor L2 is connected to a midpoint of a first bridge arm of the rectifier, a first end of the second capacitor C2 is connected to the second end of the compensation capacitor Cs, a second end of the second capacitor C2 is connected to a second end of the receive coil Ls, and the second end of the receive coil Ls is connected to a midpoint of a second bridge arm of the rectifier. $R_{load}$ in FIG. 4 represents a load of the receiver.

The following describes advantages of using the double-sided LCC in the wireless charging system.

First, an output side of the receiver implements a current source characteristic.

Second, a current of the transmit coil does not change with the load, nor changes with a relative position change between the transmit coil and the receive coil, so that control decoupling can be implemented between the transmitter and the receiver, that is, the transmitter controller controls an electrical parameter of the transmitter, and the receiver controller controls an electrical parameter of the receiver.

Third, the relative position change between the transmit coil and the receive coil has little impact on the wireless charging system.

Both the inductor and the capacitor of the transmitter LCC network and the inductor and the capacitor of the receiver LCC network perform matching at a poor coupling position, for example, when relative positions of the transmit coil and the receive coil are far. In this way, an output power requirement of the wireless charging system is met.

When the relative positions of the transmit coil and the receive coil are close, assuming that the double-sided LCC network performs complete matching, that is, $$\omega_0 \cdot L_p - \frac{1}{\omega_0 C_p} = \frac{1}{\omega_0 C_1} = \omega_0 \cdot L_1 -$$

a primary-side LCC network performs complete matching; and $$\omega_0 \cdot L_s - \frac{1}{\omega_0 C_s} = \frac{1}{\omega_0 C_2} = \omega_0 \cdot L_2 -$$

a secondary-side LCC network performs complete matching, an equivalent impedance Zin of an output end of the inverter is as follows:

$$Z_{in} = R_{in} = \frac{(\omega L_1 L_2)^2}{M^2 R_0} \quad (1)$$

where $M=k\sqrt{L_1 \cdot L_2}$.

$R_0$ is a load impedance of the receiver, that is, an impedance value of the load.

It can be learned from the foregoing formula that Zin is inversely proportional to a square of the coupling coefficient k. That is, when the relative positions of the transmit coil and the receive coil are close, k increases, and Zin decreases. M is a mutual inductance between the transmit coil and the receive coil. When power required by the wireless charging system is constant, $$P = \frac{V_{in}^2}{R_{in}}$$

As Rin decreases, Vin also needs to decrease.

Currently, the output voltage Vin of the inverter is generally controlled through phase shift control between the first bridge arm and the second bridge arm of the inverter. When Vin is small and an input voltage Vdc of the inverter is unchanged, phase shift angles of the four switching transistors Q1 to Q4 of the inverter need to be controlled to be adjusted to be small, thereby generating a waveform shown in FIG. 5.

Figure 5:
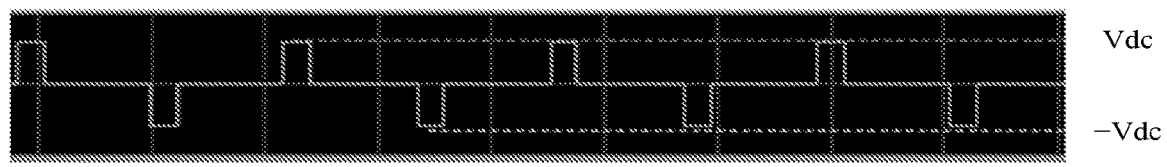
FIG. 5 is a waveform diagram of an output voltage of an inverter according to an embodiment.

FIG. 5 is a waveform diagram of an output voltage of an inverter according to an embodiment.

Vdc in FIG. 5 is the input voltage of the inverter, that is, a direct-current voltage.

It can be learned from the figure that, a high-level duration of Vin is short, and a zero crossing of a fundamental component of the output voltage of the inverter is much ahead, that is, a phase difference between the output voltage and the output current of the inverter is large, so that it is difficult for the switching transistors of the inverter to implement ZVS. In addition, because Vin decreases, a corresponding effective current value Irms increases, and therefore, losses of the switching transistors increase.

In a conventional wireless charging system, a transmitter LCC network and a receiver LCC network are always connected to a circuit and always participate in working, that is, the wireless charging system always works in a double-sided LCC architecture. When a reflected impedance of an output end of an inverter is small, it is difficult for a switching transistor of the inverter to implement ZVS, and power consumption is high.

According to the transmitter provided in embodiments, to implement ZVS of the switching transistors in the inverter, a switch circuit is disposed at the transmitter, and the transmitter controller may control an action of the switch circuit as required, to control whether the transmitter LCC network participates in working. The following describes a specific working principle with reference to accompanying drawings.

Figure 6:
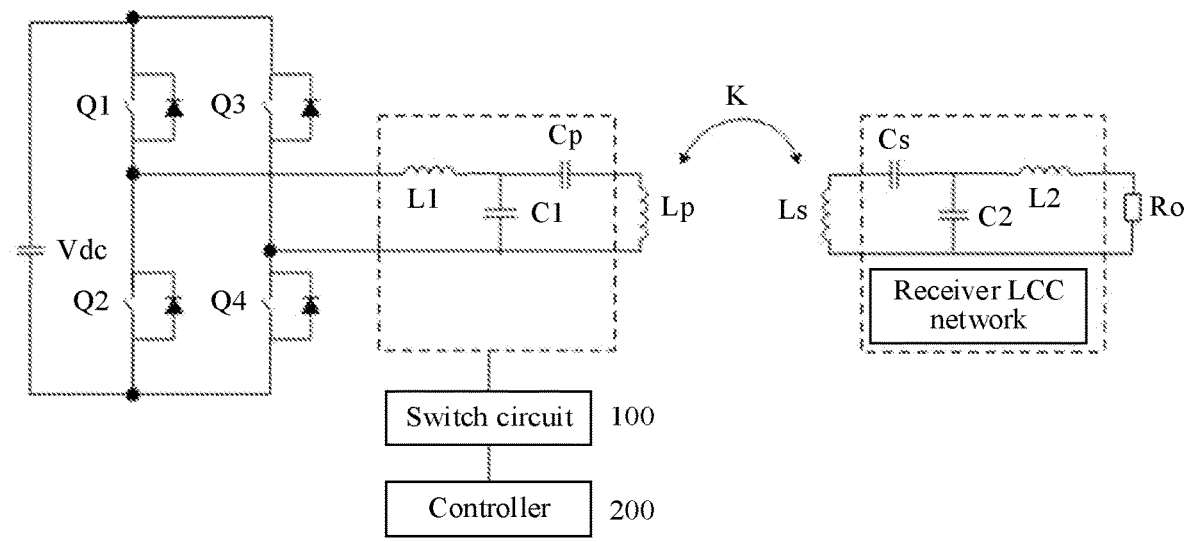
FIG. 6 is a schematic diagram of a transmitter according to an embodiment.

FIG. 6 is a schematic diagram of a transmitter according to an embodiment.

A difference between FIG. 6 and FIG. 4 lies in that a switch circuit is added to the transmitter, and a circuit of the receiver is simplified, that is, an output side of the receiver LCC network is equivalent to a purely resistive load, which is represented by a resistor Ro. k represents the coupling coefficient between the transmit coil Lp and the receive coil Ls.

The transmitter LCC network includes a first inductor L1, a first capacitor C1, and a compensation capacitor Cp.

The inverter is configured to convert a direct current of an input end into an alternating current and transmit the alternating current to the transmitter LCC network. In this embodiment, an example in which the inverter includes a full-bridge circuit including four switching transistors Q1 to Q4 is used for description.

The transmitter LCC network is configured to compensate the alternating current and then transmit an alternating current obtained through compensation to the transmit coil Lp. A switch circuit 100 is connected to the transmitter LCC network.

The transmit coil Lp is configured to transmit the received alternating current in a form of an alternating magnetic field, so that a receiver receives the alternating current. The receiver includes a receiver LCC network. The receiver LCC network is the same as that in FIG. 4, and details are not described herein again.

The receiver controller 201 is configured to: when a real part of a first output impedance of the inverter is greater than a real part of a second output impedance, control the switch circuit 100 to act, so that the wireless charging system works in a double-sided LCC network; and when the real part of the first output impedance is less than or equal to the real part of the second output impedance, control the switch circuit 100 to act, so that the wireless charging system works in a single-sided LCC network. The double-sided LCC network includes the transmitter LCC network and the receiver LCC network, and the single-sided LCC network includes the receiver LCC network. The first output impedance is an output impedance of the inverter when the wireless charging system works in the double-sided LCC, and the second output impedance is an output impedance of the inverter when the wireless charging system works in the single-sided LCC.

Figure 7:
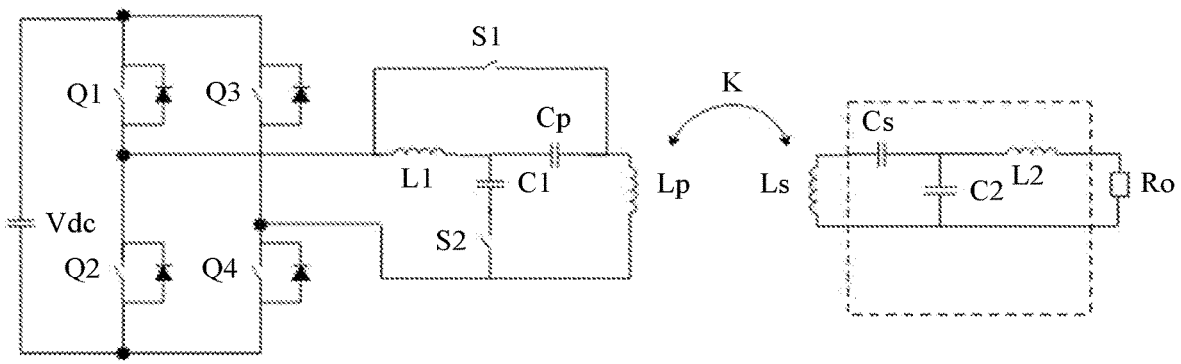
FIG. 7 is a schematic diagram of another transmitter according to an embodiment.

For an implementation of the switch circuit, refer to FIG. 7, which is a schematic diagram of another transmitter according to an embodiment.

As shown in FIG. 7, the switch circuit includes a first switch S1 and a second switch S2.

A first end of the first inductor L1 is connected to a midpoint of a first bridge arm of the inverter, and a second end of the first inductor L1 is connected to a first end of the transmit coil Lp by using the compensation capacitor Cp. A second end of the transmit coil Lp is connected to a midpoint of a second bridge arm of the inverter, a first end of the first capacitor C1 is connected to the second end of the first inductor L1, a second end of the first capacitor C1 is connected to a first end of the second switch S2, and a second end of the second switch S2 is connected to a second end of the transmit coil Lp.

A first end of the first switch S1 is connected to the first end of the first inductor L1, and a second end of the first switch S1 is connected to the first end of the transmit coil Lp.

The controller is further configured to: when the real part of the first output impedance is greater than the real part of the second output impedance, control the first switch S1 to be open, and the second switch S2 to be closed; and when the real part of the first output impedance is less than or equal to the real part of the second output impedance, control the first switch S1 to be closed, and the second switch S2 to be open.

Figure 8:
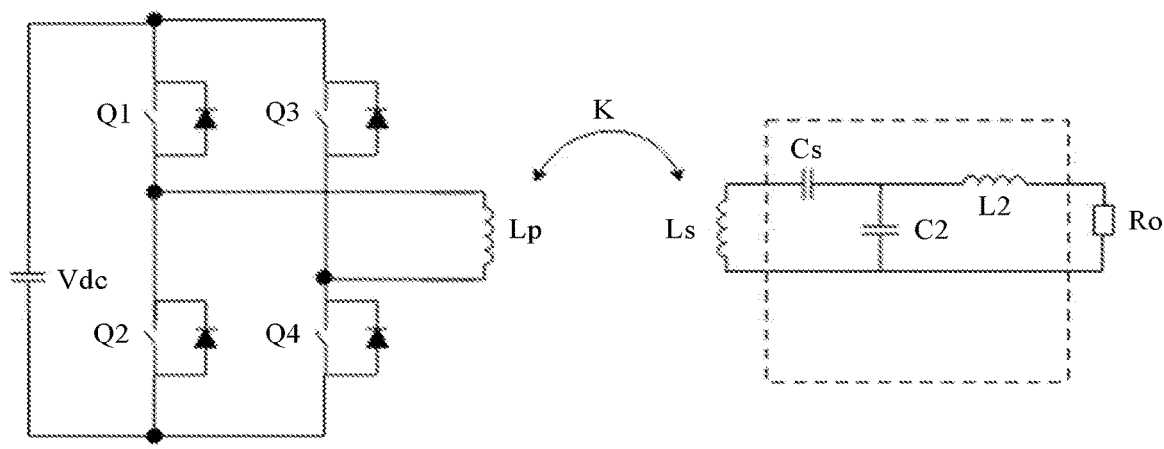
FIG. 8 is a schematic diagram of a wireless charging system including a single-sided LCC according to an embodiment.

It can be learned from FIG. 7 that, when the first switch S1 is open and the second switch S2 is closed, the transmitter LCC network participates in working, and is connected between an output end of the inverter and the transmit coil Lp. When the first switch S1 is closed, S1 bypasses L1 and Cp, that is, being short-circuited. When the second switch S2 is open, C1 is disconnected from other components. Therefore, the transmitter LCC network does not work, there is no impedance matching network at the transmitter, and only the inverter and the transmit coil are left. That is, the wireless charging system changes to a single-sided LCC architecture, and only the receiver LCC network exists. FIG. 8 is a schematic diagram of a wireless charging system including a single-sided LCC according to an embodiment.

It can be learned from FIG. 8 that when S1 is closed and S2 is open, the transmitter LCC network is disconnected from the transmitter, and only the receiver LCC network exists in the wireless charging system.

To enable a person skilled in the art to understand a principle of the technical solutions provided in embodiments, the following describes a derivation process of the solutions.

A relationship between the output voltage and the output current of the inverter depends on an output impedance of the inverter. The output impedance of the inverter is an impedance of the output end of the inverter. With reference to accompanying drawings, the following separately describes a manner of obtaining the output impedance of the inverter in a case of the double-sided LCC and a manner of obtaining the output impedance of the inverter in a case of the single-sided LCC.

Figure 9:
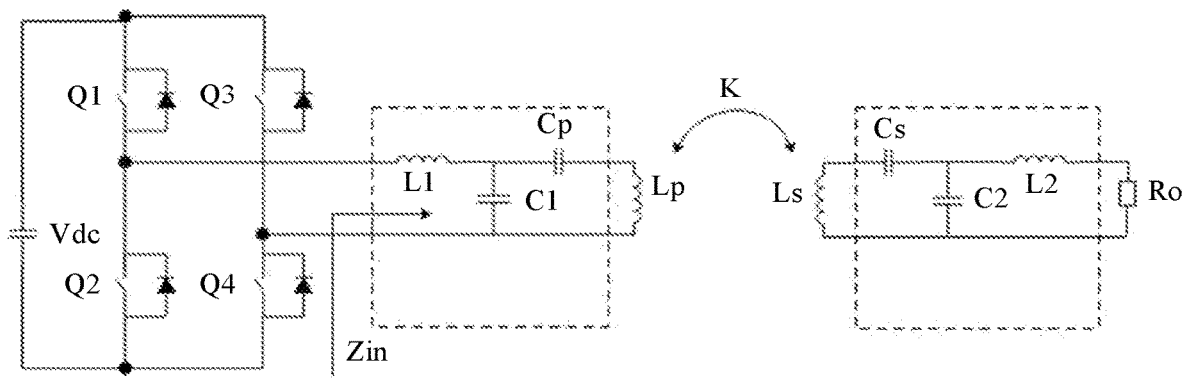
FIG. 9 is a schematic diagram of an output impedance of an inverter in a case of a double-sided LCC network according to an embodiment.

FIG. 9 is a schematic diagram of an output impedance of an inverter in a case of a double-sided LCC network according to an embodiment.

Zin in FIG. 9 represents the output impedance of the inverter, that is, an impedance reflected to the output end of the inverter.

When S1 in FIG. 7 is open and S2 is closed, the wireless charging system includes a double-sided LCC network. When Zin is large, high power transmission efficiency can be implemented when the coupling coefficient is low.

It is assumed that the load impedance of the receiver is unchanged. For the double-sided LCC compensation network, when the matching network performs complete matching, based on formula (1), the impedance Zin reflected to the inverter is inversely proportional to a square of the mutual inductance M. When the coupling coefficient is large, that is, when the relative positions of the transmit coil and the receive coil are close, corresponding Zin decreases, leading to a small phase shift angle between the output voltage and the output current of the inverter, the switching transistors cannot implement ZVS, and an effective value Iin_rms of the output current of the inverter increases. As a result, an overall loss of the transmitter increases. On the contrary, when the coupling coefficient is small, that is, when the relative positions of the transmit coil and the receive coil are far, Zin increases, the phase shift angle between the output voltage and the output current of the inverter increases, the switching transistors easily implement ZVS, Iin_rms decreases, and the overall loss of the transmitter decreases.

When S1 in FIG. 7 is closed and S2 is open, the transmitter LCC network is disconnected from the transmitter, and the wireless charging system includes a single-sided LCC network, that is, includes only the receiver LCC network. When Zin is small, high power transmission efficiency can be implemented when the coupling coefficient is high. When the coupling coefficient is high, because there is no LCC network at the transmitter, the transmit coil presents a large inductance, and the output current of the inverter lags behind the output voltage. Therefore, ZVS of the switching transistors can be easily implemented. In addition, because there is no LCC network at the transmitter, inductor and capacitor components are reduced, so that losses caused by these components are avoided, thereby further reducing overall power consumption of the transmitter.

The following describes a manner of obtaining Zin when the wireless charging system includes a single-sided LCC.

Figure 10:
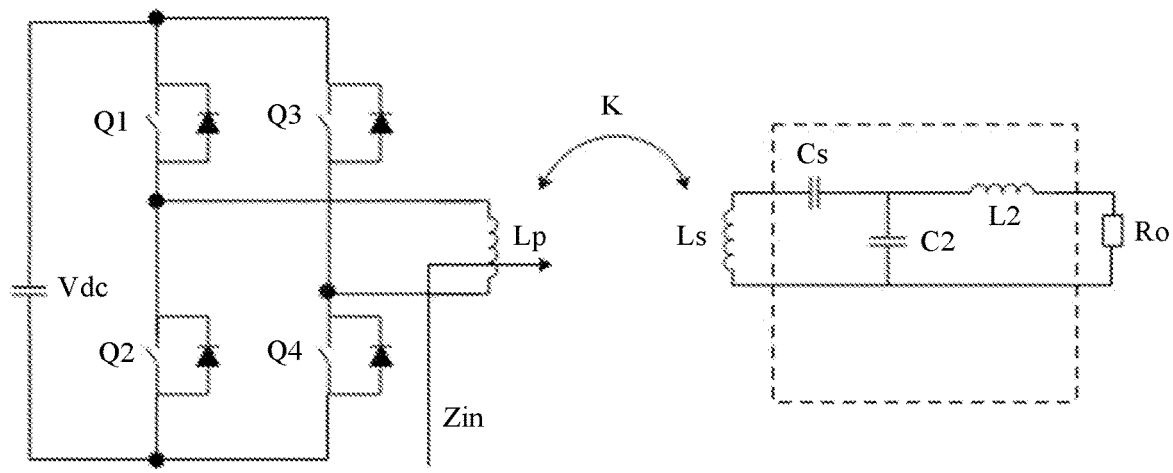
FIG. 10 is a schematic diagram of an output impedance of an inverter in a case of a single-sided LCC network according to an embodiment.

FIG. 10 is a schematic diagram of an output impedance of an inverter in a case of a single-sided LCC network according to an embodiment.

It is assumed that the load impedance Ro of the receiver is unchanged. For the single-sided LCC network, the impedance Zin reflected to the inverter is shown in formula (2):

$$Zin = \frac{M^2 R_0}{L_2^2} + j\omega L_p \qquad (2)$$

It can be learned from formula (2) that Zin is directly proportional to the square of the mutual inductance M, a larger coupling coefficient indicates a larger Zin and a larger phase shift angle between the output voltage and the output current of the inverter, it is easy for the switching transistors to implement ZVS, Iin_rms decreases, and the overall loss of the transmitter decreases. On the contrary, when the coupling coefficient is small, that is, when the relative positions of the transmit coil and the receive coil are far, Zin decreases, the phase shift angle between the output voltage and the output current of the inverter decreases, it is difficult for the switching transistors to implement ZVS, Iin_rms increases, and the overall loss of the transmitter increases.

With reference to the analysis of FIG. 9 and FIG. 10, it can be learned that, a change trend of Zin corresponding to the double-sided LCC network is exactly opposite to a change trend of Zin corresponding to the single-sided LCC network, which are applicable to exactly opposite cases.

With reference to accompanying drawings, the following describes a principle of switching between the double-sided LCC network and the single-sided LCC network. For ease of understanding, a third switch is added to the output end of the receiver LCC network.

Figure 11:
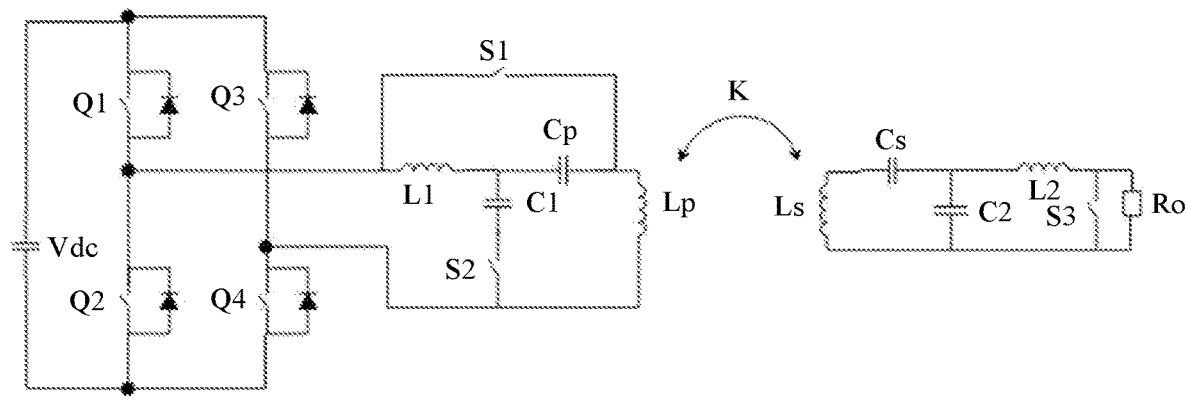
FIG. 11 is a schematic diagram of another wireless charging system according to an embodiment.

FIG. 11 is a schematic diagram of another wireless charging system according to an embodiment.

A first end of a third switch S3 added to the receiver is connected to the second end of the second inductor L2, and a second end of the third switch S3 is connected to the second end of the receive coil Ls.

It can be learned from FIG. 11 that, when the third switch S2 is closed, the load impedance of the receiver is short-circuited.

Figure 12:
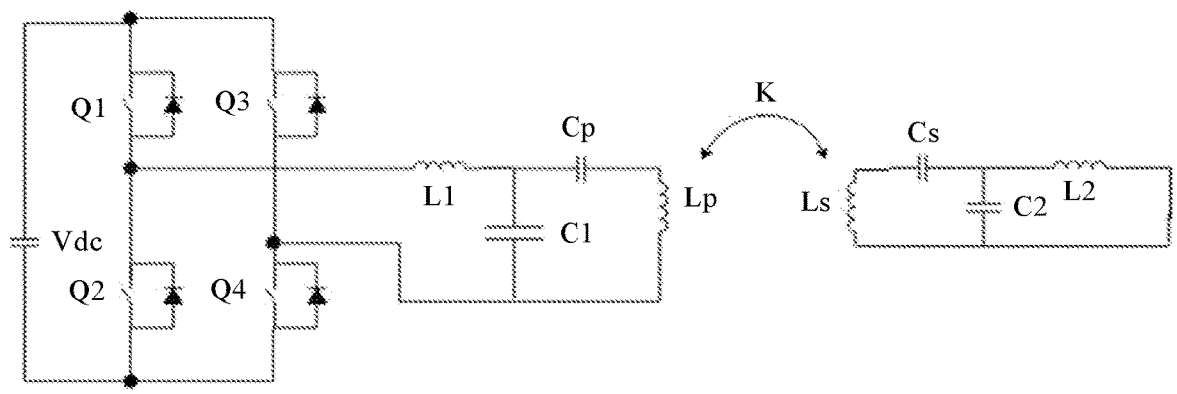
FIG. 12 is a schematic diagram in which an output end of a receiver in a wireless charging system is short-circuited according to an embodiment.

FIG. 12 is a schematic diagram in which an output end of a receiver in a wireless charging system is short-circuited according to an embodiment.

As shown in FIG. 12, before the wireless charging system discharges electricity into the load, the third switch S3 is first closed, and the output impedance is 0. The first switch S1 is opened, and the second switch S2 is closed. In this case, the wireless charging system changes to a double-sided LCC compensation mode.

In this case, the wireless charging system does not discharge electricity into the load. Therefore, to save energy, the phase shift angle θ between the output voltage and the output current of the inverter may be controlled to be small. In this case, the output voltage Vin of the inverter is:

$$V_{in} = \frac{2\sqrt{2}}{\pi} \cdot V_{dc} \cdot \sin\left(\frac{\theta}{2}\right)$$

Vdc is the input voltage of the inverter.

Based on a characteristic of the transmitter LCC network and a resonance principle, a current I1 flowing through the transmit coil Lp is:

$$I1 = \frac{V_{in}}{\omega L_1} = \frac{\frac{2\sqrt{2}}{\pi} \cdot V_{dc} \cdot \sin\left(\frac{\theta}{2}\right)}{\omega L_1}$$

Based on a characteristic of the receiver LCC network and the resonance principle, a current IL2 flowing through the second inductor L2 is:

$$IL2 = \frac{\omega M I_1}{\omega L_2} = \frac{\frac{2\sqrt{2}}{\pi} \cdot V_{dc} \cdot \sin\left(\frac{\theta}{2}\right)}{\omega L_1 L_2}$$

In the foregoing formula, IL2 may be obtained through collection by using a current sensor, and L1, L2, Vdc, and θ are all known, so that the mutual inductance M between the transmit coil and the receive coil may be obtained:

$$M = \frac{\omega L_1 L_2 \cdot IL2}{\frac{2\sqrt{2}}{\pi} \cdot V_{dc} \cdot \sin\left(\frac{\theta}{2}\right)}$$

It should be understood that the mutual inductance M between the transmit coil and the receive coil may also be referred to as a mutual inductance between the transmitter and the receiver. In addition to the foregoing calculation manner, the mutual inductance M may be obtained in other manners, for example, measuring a voltage at two ends of the second inductor L2 and a current of the transmit coil, where the voltage at the two ends of the second inductor L2 may be an open-circuit voltage measured by open-circuiting the output end of the receiver LCC network. The mutual inductance M may be understood as a mutual inductance of a transformer, the transmit coil and the receive coil are respectively a primary side and a secondary side of the transformer, and the mutual inductance M is directly proportional to the voltage at the two ends of L2, and is inversely proportional to the current of the transmit coil.

The load impedance Ro of the receiver is obtained based on an actual output voltage of the receiver of the wireless charging system and a preset current, and based on formulas (1) and (2), real parts Zin_re1 and Zin_re2 of the output impedance Zin of the inverter that respectively correspond to the double-sided LCC and the single-sided LCC may be calculated by using formula (3) and formula (4):

$$Z_{in\_re1} = \frac{(\omega L_1 L_2)^2}{M^2 R_0} \quad (3)$$

$$Z_{in\_re2} = \frac{M^2 R_0}{L_2^2} \quad (4)$$

It can be learned by analyzing formula (3) and formula (4) that, for the double-sided LCC, a value of Zin_re1 is inversely proportional to the mutual inductance M, that is, better coupling between the transmitter and the receiver indicates a smaller Zin_re1. For the single-sided LCC, a value of Zin_re2 is directly proportional to the mutual inductance M, that is, better coupling between the transmitter and the receiver indicates a larger Zin_re2.

Whether the wireless charging system works in the double-sided LCC network or the single-sided LCC network is determined by comparing Zin_re1 corresponding to the double-sided LCC network with Zin_re2 corresponding to the single-sided LCC network.

When Zin_re1>Zin_re2, the wireless charging system works in the double-sided LCC network, that is, S1 is open, and S2 is closed.

When Zin_re1<Zin_re2, the wireless charging system works in the single-sided LCC network, that is, S1 is closed, and S2 is open.

When the wireless charging system selects the LCC network, S3 is open, and the wireless charging system enters a normal charging mode.

According to the transmitter provided in embodiments, whether the transmitter LCC network participates in working may be determined based on a requirement of the wireless charging system. When the coupling between the transmit coil and the receive coil is poor, that is, M is small, to implement ZVS of the switching transistors of the inverter, the transmitter LCC network is controlled to participate in working, and the wireless charging system works in the double-sided LCC network, so that high wireless charging efficiency can be implemented. When the coupling between the transmit coil and the receive coil of the wireless charging system is good, that is, M is large, if the wireless charging system uses the double-sided LCC network, it is difficult for the switching transistors in the inverter of the transmitter to implement ZVS, and the switching transistors are in a hard switching state and generate severe heat, which increase power consumption and may not normally run. Therefore, the transmitter controller controls the transmitter LCC network not to participate in working, that is, the wireless charging system works in the single-sided LCC network, and the transmit coil presents an inductance, so that ZVS of the switching transistors in the inverter is easily implemented, thereby reducing power consumption and improving wireless charging efficiency. Therefore, the transmitter provided in embodiments can ensure high charging efficiency when the coupling between the transmitter and the receiver is good, and can also ensure high charging efficiency when the coupling between the transmitter and the receiver is low, so that the transmitter has a wide coupling range, and can be applied to charging of electric vehicles of different vehicle types, while ensuring high charging efficiency.

Based on the wireless charging transmitter provided in the foregoing embodiments, an embodiment further provides a wireless charging receiver, which is described below in detail.

In the transmitter provided in the foregoing embodiments, the transmitter is used as an execution body. The transmitter compares the real part of the first output impedance with the real part of the second output impedance, and controls an action of the switch circuit based on a comparison result, to switch between the double-sided LCC network and the single-sided LCC network. It should be understood that the receiver may also be used as an execution body. The receiver compares the real part of the first output impedance with the real part of the second output impedance, and sends a comparison result to the transmitter, or sends an instruction to the transmitter based on the comparison result, so that the transmitter directly controls an action of the switch circuit, to switch between the double-sided LCC network and the single-sided LCC network. Other actions performed by the transmitter in the foregoing embodiments may also be performed by the receiver, which are described below in detail. For a specific working principle, refer to the description of the foregoing embodiments of the transmitter. Only brief description is provided herein, and details are not described herein again.

The receiver controller is further configured to obtain the first output impedance based on the first inductor in the transmitter LCC network, the second inductor in the receiver LCC network, the load impedance of the receiver, and the mutual inductance between the transmitter and the receiver.

The receiver controller is further configured to obtain the second output impedance based on the second inductor in the receiver LCC network, the load impedance of the receiver, and the mutual inductance between the transmitter and the receiver.

The receiver controller is further configured to obtain the mutual inductance based on the first inductor in the transmitter LCC network, the second inductor in the receiver LCC network, the current of the second inductor, the input voltage of the inverter, and the phase shift angle of the inverter. The phase shift angle of the inverter is the phase difference between the output voltage and the output current of the inverter.

The receiver controller is further configured to obtain the load impedance of the receiver based on the output voltage of the receiver and the preset current.

The receiver controller is further configured to obtain the first output impedance $Z_{in\_re1}$ according to the following formula:

$$Z_{in\_re1} = \frac{(\omega L_1 L_2)^2}{M^2 R_0}$$

$L_1$ represents an inductance value of the first inductor, $L_2$ represents an inductance value of the second inductor, M represents the mutual inductance, and $R_0$ represents the output impedance.

The receiver controller is further configured to obtain the second output impedance $Z_{in\_re2}$ according to the following formula:

$$Z_{in\_re2} = \frac{M^2 R_0}{L_2^2}$$

$L_2$ represents the inductance value of the second inductor, M represents the mutual inductance, and $R_0$ represents the output impedance.

The receiver controller is further configured to obtain the mutual inductance M according to the following formula:

$$M = \frac{\omega L_1 L_2 \cdot I_{L2}}{\frac{2\sqrt{2}}{\pi} \cdot V_{dc} \cdot \sin\left(\frac{\theta}{2}\right)}$$

$L_1$ represents the inductance value of the first inductor, $L_2$ represents the inductance value of the second inductor, $I_{L2}$ represents the inductance of the second inductor, $V_{dc}$ represents the input voltage of the inverter, and θ represents the phase shift angle.

Based on the wireless charging transmitter and receiver that are provided in the foregoing embodiments, an embodiment further provides a wireless charging system. That is, the wireless charging system includes a transmitter and a receiver. The transmitter may be the transmitter described in the foregoing embodiments and control switching between a double-sided LCC and a single-sided LCC, or the receiver may implement switching between the double-sided LCC and the single-sided LCC.

For the receiver in the wireless charging system provided in this embodiment, still refer to FIG. 4. For the transmitter included in the wireless charging system, refer to the transmitter provided in the foregoing embodiments. The receiver includes a rectifier, a receiver LCC network, and a receive coil Ls. The rectifier is described by using a full-bridge rectifier as an example. The rectifier in the figure includes four switching transistors S1 to S4. S1 and S2 are connected in series to form a first bridge arm of the rectifier, and S3 and S4 are connected in series to form a second bridge arm of the rectifier.

The receive coil Ls is configured to receive electric energy from the transmit coil Lp and transmit the electric energy to the receiver LCC network.

The receiver LCC network is configured to compensate the received alternating current and then transmit the alternating current to the rectifier.

The rectifier is configured to rectify the received alternating current into a direct current to charge a load Rload.

The receiver LCC network includes a compensation capacitor Cs, a second capacitor C2, and a second inductor L2. A first end of the compensation capacitor Cs is connected to a first end of the receive coil Ls, a second end of the compensation capacitor Cs is connected to a first end of the second inductor L2, and a second end of L2 is connected to a midpoint of the first bridge arm of the rectifier, that is, a midpoint of S1 and S2. A first end of the second capacitor C2 is connected to a second end of Cs, and a second end of C2 is connected to a second end of Ls. That is, the receiver also uses an LCC network.

According to the wireless charging system provided in this embodiment, when coupling between the transmitter and the receiver is poor, the transmitter LCC network is controlled to not work, and only the receiver LCC network works, that is, a single-sided LCC network is used, so that switching transistors of the transmitter can implement ZVS, and high charging efficiency of the wireless charging system can be ensured. When the coupling between the transmitter and the receiver is good, both the transmitter LCC network and the receiver LCC network work, that is, a double-sided LCC network is used, to ensure that the switching transistors of the transmitter can implement ZVS, and ensure high charging efficiency of the wireless charging system. For example, when the transmitter charges an electric vehicle with a low chassis, the transmitter LCC network participates in working, and the wireless charging system works in a double-sided LCC mode. When the transmitter charges an electric vehicle with a high chassis, the transmitter LCC network does not participate in working, and the wireless charging system works in a single-sided LCC mode.

Based on the wireless charging transmitter, the wireless charging receiver, and the wireless charging system that are provided in the foregoing embodiments, an embodiment further provides a wireless charging method, which is described below in detail with reference to accompanying drawings.

Figure 13:
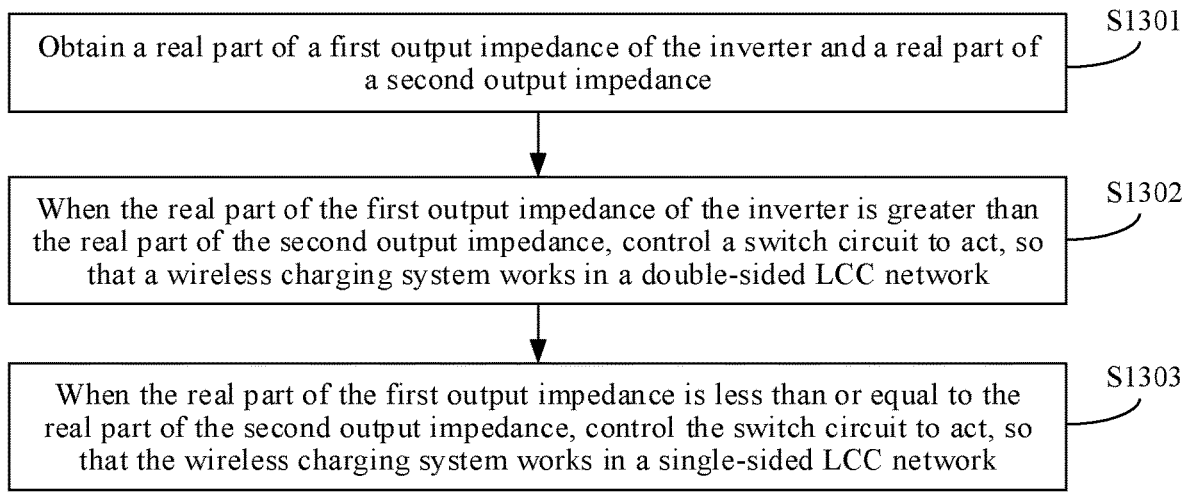
FIG. 13 is a flowchart of a wireless charging method according to an embodiment.

FIG. 13 is a flowchart of a wireless charging method according to an embodiment.

The wireless charging method provided in this embodiment is applied to the wireless charging transmitter provided in the foregoing embodiment. For details, refer to the transmitter shown in FIG. 6. The transmitter includes an inverter, a transmitter LCC network, a transmit coil, and a switch circuit. An output end of the inverter is connected to the transmit coil by using the transmitter LCC network. The switch circuit is connected to the transmitter LCC network. A specific connection relationship of the transmitter is not described herein again.

The method includes the following steps:

S1301: Obtain a real part of a first output impedance of the inverter and a real part of a second output impedance. The first output impedance is an output impedance of the inverter when the wireless charging system works in a double-sided LCC, and the second output impedance is an output impedance of the inverter when the wireless charging system works in a single-sided LCC. In other words, real parts of an output impedance of the inverter that respectively correspond to the double-sided LCC and the single-sided LCC are obtained.

S1302: When the real part of the first output impedance of the inverter is greater than the real part of the second output impedance, control the switch circuit to act, so that the wireless charging system works in the double-sided LCC network. The double-sided LCC network includes the transmitter LCC network and the receiver LCC network. In other words, a value of the real part of the first output impedance is compared with a value of the real part of the second output impedance, and whether the transmitter LCC network participates in working is determined based on a value relationship. Because a relationship between the real part of the first output impedance and M is exactly opposite to a relationship between the real part of the second output impedance and M, where the real part of the first output impedance is inversely proportional to M, and the real part of the second output impedance is directly proportional to M, different LCC networks are used when the real part of the first output impedance and the real part of the second output impedance are in different value relationships.

S1303: When the real part of the first output impedance is less than or equal to the real part of the second output impedance, control the switch circuit to act, so that the wireless charging system works in the single-sided LCC network. The single-sided LCC network includes the receiver LCC network.

According to the method provided in this embodiment, when coupling between the transmitter and the receiver is poor, the transmitter LCC network is controlled to not work, and only the receiver LCC network works, that is, the single-sided LCC network is used, so that switching transistors of the transmitter can implement ZVS, and high charging efficiency of the wireless charging system can be ensured. When the coupling between the transmitter and the receiver is good, both the transmitter LCC network and the receiver LCC network work, that is, the double-sided LCC network is used, to ensure that the switching transistors of the transmitter can implement ZVS, and ensure high charging efficiency of the wireless charging system. For example, when the transmitter charges an electric vehicle with a low chassis, the transmitter LCC network participates in working, and the wireless charging system works in a double-sided LCC mode. When the transmitter charges an electric vehicle with a high chassis, the transmitter LCC network does not participate in working, and the wireless charging system works in a single-sided LCC mode.

The following describes a specific implementation of the switch circuit of the transmitter. The switch circuit includes a first switch and a second switch. The transmitter LCC includes a first inductor, a first capacitor, and a compensation capacitor. A first end of the first inductor is connected to a midpoint of a first bridge arm of the inverter, and a second end of the first inductor is connected to a first end of the transmit coil by using the compensation capacitor. A second end of the transmit coil is connected to a midpoint of a second bridge arm of the inverter, a first end of the first capacitor is connected to the second end of the first inductor, a second end of the first capacitor is connected to a first end of the second switch, and a second end of the second switch is connected to the second end of the transmit coil. A first end of the first switch is connected to the first end of the first inductor, and a second end of the first switch is connected to the first end of the transmit coil.

The controlling the switch circuit to act, so that the wireless charging system works in the double-sided LCC network specifically includes: controlling the first switch to be open, and the second switch to be closed, so that the wireless charging system works in the double-sided LCC network.

The controlling the switch circuit to act, so that the wireless charging system works in the single-sided LCC network specifically includes: controlling the first switch to be closed, and the second switch to be open, so that the wireless charging system works in the single-sided LCC network.

Specifically, the transmitter controller may control states of the first switch and the second switch to determine whether the transmitter LCC network participates in working.

The following describes, with reference to an accompanying drawing, a specific implementation process of the method provided in this embodiment.

Figure 14:
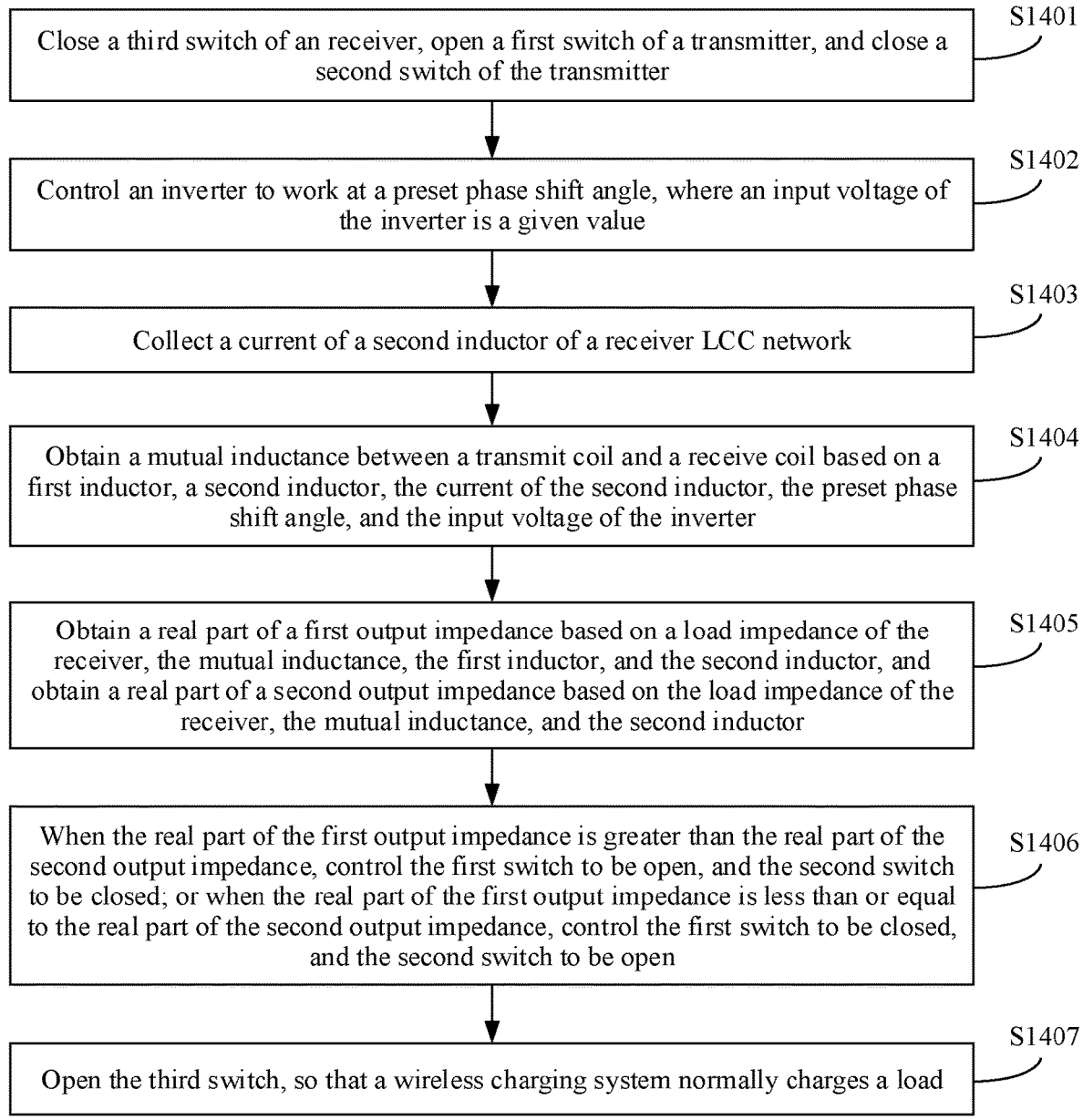
FIG. 14 is a flowchart of another wireless charging method according to an embodiment.

FIG. 14 is a flowchart of another wireless charging method according to an embodiment.

S1401: Close the third switch of the receiver, open the first switch of the transmitter, and close the second switch of the transmitter, that is, the output end of the receiver is short-circuited, and the wireless charging system works in a double-sided LCC network.

S1402: Control the inverter to work at a preset phase shift angle, where an input voltage of the inverter is a given value. The preset phase shift angle is a small angle, and in this case, the wireless charging system does not charge a load.

S1403: Collect a current of the second inductor of the receiver LCC network.

S1404: Obtain a mutual inductance between the transmit coil and the receive coil based on the first inductor, the second inductor, the current of the second inductor, the preset phase shift angle, and the input voltage of the inverter.

S1405: Obtain a real part of a first output impedance based on a load impedance of the receiver, the mutual inductance, the first inductor, and the second inductor, and obtain a real part of a second output impedance based on the load impedance of the receiver, the mutual inductance, and the second inductor.

S1406: When the real part of the first output impedance is greater than the real part of the second output impedance, control the first switch to be open, and the second switch to be closed; or when the real part of the first output impedance is less than or equal to the real part of the second output impedance, control the first switch to be closed, and the second switch to be open.

S1407: Open the third switch, so that the wireless charging system normally charges a load.

According to the wireless charging method provided in this embodiment, when coupling between the transmitter and the receiver is poor, the transmitter LCC network is controlled to not work, and only the receiver LCC network works, that is, the single-sided LCC network is used, so that switching transistors of the transmitter can implement ZVS, and ensure high charging efficiency of the wireless charging system. When the coupling between the transmitter and the receiver is good, both the transmitter LCC network and the receiver LCC network work, that is, the double-sided LCC network is used, to ensure that the switching transistors of the transmitter can implement ZVS, and ensure high charging efficiency of the wireless charging system. For example, when the transmitter charges an electric vehicle with a low chassis, the transmitter LCC network participates in working, and the wireless charging system works in a double-sided LCC mode. When the transmitter charges an electric vehicle with a high chassis, the transmitter LCC network does not participate in working, and the wireless charging system works in a single-sided LCC mode.

It should be understood that "at least one (item)" refers to one or more, and "a plurality of" refers to two or more. Therefore, any simple amendment or equivalent variation and modification made to the foregoing embodiments according to the technical essence of this disclosure without departing from the content of the technical solutions of this disclosure shall fall within the protection scope of the technical solutions.

What is claimed is:

1. A wireless charging transmitter comprising:
   an inverter configured to:
      convert a direct current into an alternating current; and
      transmit the alternating current;
   a transmitter inductor-capacitor-capacitor (LCC) network configured to:
      receive the alternating current from the inverter;
      compensate the alternating current to obtain a compensated alternating current; and
      transmit the compensated alternating current;
   a transmit coil configured to:
      receive the compensated alternating current from the transmitter LCC; and
      transmit the compensated alternating current as an alternating magnetic field to enable a wireless charging receiver to receive the alternating magnetic field;
   a switch circuit connected to the transmitter LCC network; and
   a transmitter controller configured to:
      control, when a first real part of a first output impedance of the inverter is greater than a second real part of a second output impedance of the inverter, the switch circuit to enable a wireless charging system to work in a double-sided LCC network, wherein the first output impedance occurs when the wireless charging system works in the double-sided LCC network, wherein the second output impedance occurs when the wireless charging system works in a single-sided LCC network, wherein the wireless charging system comprises the wireless charging transmitter and the wireless charging receiver, and wherein the double-sided LCC network comprises the transmitter LCC network and a receiver LCC network of the wireless charging receiver; and
      control, when the first real part is less than or equal to the second real part, the switch circuit to enable the wireless charging system to work in the single-sided LCC network.

2. The wireless charging transmitter of claim 1, wherein the transmitter LCC comprises a first inductor, a first capacitor, and a compensation capacitor, wherein the switch circuit comprises a first switch and a second switch, wherein a first end of the first inductor is connected to a midpoint of a first bridge arm of the inverter, wherein a second end of the first inductor is connected to a first end of the transmit coil using the compensation capacitor, wherein a second end of the transmit coil is connected to a midpoint of a second bridge arm of the inverter, wherein a first end of the first capacitor is connected to the second end of the first inductor, wherein a second end of the first capacitor is connected to a first end of the second switch, wherein a second end of the second switch is connected to the second end of the transmit coil, wherein a first end of the first switch is connected to the first end of the first inductor, wherein a second end of the first switch is connected to the first end of the transmit coil, wherein the transmitter controller is further configured to:
   further control, when the first real part is greater than the second real part, the first switch to be open and the second switch to be closed; and
   further control, when the first real part is less than or equal to the second real part, the first switch to be closed and the second switch to be open.

3. The wireless charging transmitter of claim 1, wherein the transmitter controller is further configured to obtain the first output impedance based on a first inductor in the transmitter LCC network, a second inductor in the receiver LCC network, a load impedance of the wireless charging receiver, and a mutual inductance between the wireless charging transmitter and the wireless charging receiver.

4. The wireless charging transmitter of claim 3, wherein the transmitter controller is further configured to obtain the second output impedance based on the second inductor, the load impedance, and the mutual inductance.

5. The wireless charging transmitter of claim 4, wherein the transmitter controller is further configured to further obtain the second output impedance according to the following formula:

$$Z_{in_{re2}} = \frac{M^2 R_0}{L_2^2},$$

wherein $Z_{in\_re2}$ represents the second output impedance, $L_2$ represents an inductance value of the second inductor, M represents the mutual inductance, and $R_0$ represents the output impedance.

6. The wireless charging transmitter of claim 3, wherein the transmitter controller is further configured to obtain the mutual inductance based on the first inductor, the second inductor, an inductor current of the second inductor, an input voltage of the inverter, and a phase shift angle of the inverter, and wherein the phase shift angle is a phase difference between an inverter output voltage of the inverter and an inverter output current of the inverter.

7. The wireless charging transmitter of claim 6, wherein the transmitter controller is further configured to further obtain the mutual inductance according to the following formula:

$$M = \frac{\omega L_1 L_2 \cdot IL2}{\frac{2\sqrt{2}}{\pi} \cdot V_{dc} \cdot \sin\left(\frac{\theta}{2}\right)}$$

wherein M represents the mutual inductance, ω represents an angular velocity, $L_1$ represents a first inductance value of the first inductor, $L_2$ represents a second inductance value of the second inductor, $I_{L2}$ represents the inductor current, $V_{dc}$ represents the input voltage, and θ represents the phase shift angle.

8. The wireless charging transmitter of claim 3, wherein the transmitter controller is further configured to obtain the load impedance based on a receiver output voltage of the wireless charging receiver and a preset current.

9. The wireless charging transmitter of claim 3, wherein the transmitter controller is further configured to further obtain the first output impedance according to the following formula:

$$Z_{in_{re1}} = \frac{(\omega L_1 L_2)^2}{M^2 R_0},$$

wherein ω represents an angular velocity, $Z_{in\_re1}$ represents the first output impedance, $L_1$ represents a first inductance value of the first inductor, $L_2$ represents a second inductance value of the second inductor, M represents the mutual inductance, and $R_0$ represents the load impedance.

10. A wireless charging receiver comprising:
a receive coil configured to:
  receive electromagnetic energy as an alternating magnetic field from a transmit coil of a wireless charging transmitter; and
  transmit the alternating magnetic field as an alternating current;
a receiver inductor-capacitor-capacitor (LCC) network configured to:
  receive the alternating current from the receive coil;
  compensate the alternating current to obtain a compensated alternating current; and
  transmit the compensated alternating current;
a rectifier configured to:
  receive the compensated alternating current from the receiver; and
  rectify the compensated alternating current into a direct current for charging a load; and
a receiver controller configured to:
  send, when a first real part of a first output impedance of an inverter of the wireless charging transmitter is greater than a second real part of a second output impedance, a double-sided LCC network instruction to the wireless charging transmitter to enable a wireless charging system to work in a double-sided LCC network, wherein the first output impedance occurs when the wireless charging system works in the double-sided LCC network, wherein the second output impedance occurs when the wireless charging system works in a single-sided LCC network, wherein the wireless charging system comprises the wireless charging receiver and the wireless charging transmitter, and wherein the double-sided LCC network comprises the receiver LCC network and a transmitter LCC network of the wireless charging transmitter; and
  send, when the first real part is less than or equal to the second real part, a single-sided LCC network instruction to the wireless charging transmitter to enable the wireless charging system to work in the single-sided LCC network.

11. The wireless charging receiver of claim 10, wherein the receiver controller is further configured to obtain the first output impedance based on a first inductor in the transmitter LCC network, a second inductor in the receiver LCC network, a load impedance of the wireless charging receiver, and a mutual inductance between the wireless charging transmitter and the wireless charging receiver.

12. The wireless charging receiver of claim 11, wherein the receiver controller is further configured to obtain the second output impedance based on the second inductor, the load impedance, and the mutual inductance.

13. The wireless charging receiver of claim 12, wherein the receiver controller is further configured to further obtain the second output impedance according to the following formula:

$$Z_{in_{re2}} = \frac{M^2 R_0}{L_2^2}$$

wherein $Z_{in\_re2}$ represents the second output impedance, $L_2$ represents an inductance value of the second inductor, M represents the mutual inductance, and $R_0$ represents the output impedance.

14. The wireless charging receiver of claim 11, wherein the receiver controller is further configured to obtain the mutual inductance based on the first inductor, the second inductor, an inductor current of the second inductor, an input voltage of the inverter, and a phase shift angle of the inverter, and wherein the phase shift angle is a phase difference between an inverter output voltage of the inverter and an inverter output current of the inverter.

15. The wireless charging receiver of claim 14, wherein the receiver controller is further configured to further obtain the mutual inductance according to the following formula:

$$M = \frac{\omega L_1 L_2 \cdot IL2}{\frac{2\sqrt{2}}{\pi} \cdot V_{dc} \cdot \sin\left(\frac{\theta}{2}\right)}$$

wherein ω represents an angular velocity, M represents the mutual inductance, $L_1$ represents a first inductance value of the first inductor, $L_2$ represents a second inductance value of the second inductor, $I_{L2}$ represents the inductor current, $V_{dc}$ represents the input voltage, and θ represents the phase shift angle.

16. The wireless charging receiver of claim 11, wherein the receiver controller is further configured to obtain the load impedance based on an output voltage of the wireless charging receiver and a preset current.

17. The wireless charging receiver of claim 11, wherein the receiver controller is further configured to further obtain the first output impedance according to the following formula:

$$Z_{in_{re1}} = \frac{(\omega L_1 L_2)^2}{M^2 R_0}$$

wherein $\omega$ represents an angular velocity, $Z_{in\_re1}$ represents the first output impedance, $L_1$ represents a first inductance value of the first inductor, $L_2$ represents a second inductance value of the second inductor, M represents the mutual inductance, and $R_0$ represents the output impedance.

18. A wireless charging system comprising:
a wireless charging receiver; and
a wireless charging transmitter comprising:
  an inverter configured to:
    convert a direct current into an alternating current; and
    transmit the alternating current;
  a transmitter inductor-capacitor-capacitor (LCC) network configured to:
    receive the alternating current from the inverter;
    compensate the alternating current to obtain a compensated alternating current; and
    transmit the compensated alternating current;
  a transmit coil configured to:
    receive the compensated alternating current from the transmitter LCC; and
    transmit the compensated alternating current as an alternating magnetic field to enable the wireless charging receiver to receive the alternating magnetic field;
  a switch circuit connected to the transmitter LCC network; and
  a transmitter controller configured to:
    control, when a first real part of a first output impedance of the inverter is greater than a second real part of a second output impedance of the inverter, the switch circuit to enable the wireless charging system to work in a double-sided LCC network, wherein the first output impedance occurs when the wireless charging system works in the double-sided LCC network, wherein the second output impedance occurs when the wireless charging system works in a single-sided LCC network, wherein the wireless charging system comprises the wireless charging transmitter and the wireless charging receiver, and wherein the double-sided LCC network comprises the transmitter LCC network and a receiver LCC network of the wireless charging receiver; and
    control, when the first real part is less than or equal to the second real part, the switch circuit to enable the wireless charging system to work in the single-sided LCC network.

19. The wireless charging system of claim 18, wherein the transmitter LCC comprises a first inductor, a first capacitor, and a compensation capacitor, wherein the switch circuit comprises a first switch and a second switch, wherein a first end of the first inductor is connected to a midpoint of a first bridge arm of the inverter, wherein a second end of the first inductor is connected to a first end of the transmit coil using the compensation capacitor, wherein a second end of the transmit coil is connected to a midpoint of a second bridge arm of the inverter, wherein a first end of the first capacitor is connected to the second end of the first inductor, wherein a second end of the first capacitor is connected to a first end of the second switch, wherein a second end of the second switch is connected to the second end of the transmit coil, wherein a first end of the first switch is connected to the first end of the first inductor, wherein a second end of the first switch is connected to the first end of the transmit coil, wherein the transmitter controller is further configured to:
  further control, when the first real part is greater than the second real part, the first switch to be open and the second switch to be closed; and
  further control, when the first real part is less than or equal to the second real part, the first switch to be closed and the second switch to be open.

20. The wireless charging system of claim 18, wherein the transmitter controller is further configured to obtain the first output impedance based on a first inductor in the transmitter LCC network, a second inductor in the receiver LCC network, a load impedance of the wireless charging receiver, and a mutual inductance between the wireless charging transmitter and the wireless charging receiver.

* * * * *

UNITED STATES PATENT AND TRADEMARK OFFICE
CERTIFICATE OF CORRECTION

PATENT NO. : 12,388,297 B2
APPLICATION NO. : 18/582151
DATED : August 12, 2025
INVENTOR(S) : Shuyang Wang, Zhixian Wu and Yanding Liu Page 1 of 1

It is certified that error appears in the above-identified patent and that said Letters Patent is hereby corrected as shown below:

In the Claims

Claim 7, Column 25, Line 10: "$\omega L_1 L_2 \cdot IL2$" should read "$\omega L_1 L_2 \cdot I_{L2}$"

Claim 15, Column 26, Line 52: "$\omega L_1 L_2 \cdot IL2$" should read "$\omega L_1 L_2 \cdot I_{L2}$"

Signed and Sealed this
Thirtieth Day of September, 2025

John A. Squires
*Director of the United States Patent and Trademark Office*